United States Patent
Harashima et al.

(10) Patent No.: US 10,404,194 B2
(45) Date of Patent: Sep. 3, 2019

(54) MOTOR DRIVER WITH MULTIPURPOSE PIN

(71) Applicant: SEMICONDUCTOR COMPONENTS INDUSTRIES, LLC, Phoenix, AZ (US)

(72) Inventors: Takashi Harashima, Ota (JP); Fumio Kumazawa, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/113,127

(22) Filed: Aug. 27, 2018

(65) Prior Publication Data
US 2018/0367068 A1 Dec. 20, 2018

Related U.S. Application Data

(63) Continuation of application No. 15/654,365, filed on Jul. 19, 2017, now Pat. No. 10,084,397.
(Continued)

(51) Int. Cl.
*H02P 1/04* (2006.01)
*H02P 27/08* (2006.01)
(Continued)

(52) U.S. Cl.
CPC .............. *H02P 1/04* (2013.01); *B60L 15/20* (2013.01); *G05B 19/00* (2013.01); *H02H 7/08* (2013.01);
(Continued)

(58) Field of Classification Search
CPC ...... H02P 1/00; H02P 3/00; H02P 6/00; H02P 27/04; H02P 27/06; H02P 21/00;
(Continued)

(56) References Cited

U.S. PATENT DOCUMENTS 6,320,822 B1 11/2001 Okeya et al.
8,994,310 B2 * 3/2015 Wu .................. H02P 31/00
318/400.19

(Continued)

FOREIGN PATENT DOCUMENTS

| JP | H08178693 A | 7/1996 |
| JP | 2010028670 A | 2/2010 |
| JP | 2012165520 A | 8/2012 |

OTHER PUBLICATIONS

Rohm Semiconductor, "Multifunction Single-phase Full-wave Fan Motor Driver," DC Brushless Fan Motor Drivers, Jun. 19, 2015, Rev. 001, 31 pages.

*Primary Examiner* — Antony M Paul
(74) *Attorney, Agent, or Firm* — IPTechLaw

(57) ABSTRACT

In an embodiment, a motor driver comprises a multipurpose pin operable to couple the motor driver to a controller and judgment logic coupled to the multipurpose pin. The motor driver is operable to receive an input signal via the multipurpose pin and may be operable in a normal operation mode or a setting operation mode. The judgment logic may be operable to detect whether a prescribed pattern is present in the input signal, wherein the prescribed pattern indicates one of the normal operation mode or the setting operation mode, control at least a portion of the motor driver to operate in the setting operation mode when the prescribed pattern is detected in the input signal, and control at least the portion of the motor driver to operate in the normal operation mode when the prescribed pattern is not detected in the input signal.

20 Claims, 10 Drawing Sheets

Related U.S. Application Data

(60) Provisional application No. 62/368,949, filed on Jul. 29, 2016.

(51) Int. Cl.
| | |
|---|---|
| *H02P 6/08* | (2016.01) |
| *H02H 7/08* | (2006.01) |
| *B60L 15/20* | (2006.01) |
| *G05B 19/00* | (2006.01) |
| *H02P 23/00* | (2016.01) |

(52) U.S. Cl.
CPC .......... *H02P 6/085* (2013.01); *H02P 23/0027* (2013.01); *H02P 27/08* (2013.01); *B60L 2240/421* (2013.01); *B60L 2240/423* (2013.01); *B60L 2260/42* (2013.01); *Y02T 10/644* (2013.01); *Y02T 10/645* (2013.01); *Y02T 10/7275* (2013.01)

(58) Field of Classification Search
CPC .......... H02P 41/00; H02P 27/08; H02P 6/085; H02P 1/04; H02H 7/08; B60L 15/20; G05B 19/00
USPC ..... 318/400.01, 400.02, 700, 701, 727, 779, 318/799, 599, 800, 801, 430, 490, 811; 307/412; 327/108; 345/110; 365/185.23
See application file for complete search history.

(56) References Cited

U.S. PATENT DOCUMENTS

| | | |
|---|---|---|
| 2007/0200518 A1 | 8/2007 | Verge |
| 2010/0020625 A1 | 1/2010 | Morimoto et al. |
| 2011/0029137 A1 | 2/2011 | Yasohara et al. |
| 2014/0203749 A1* | 7/2014 | Wu ........................ G05B 19/00 318/490 |

\* cited by examiner

| Mode judgment time | Normal mode enable | Setting mode enable | Driving enable (conventional) | Driving enable (trial) | Driving enable (final) |
|---|---|---|---|---|---|
| Normal mode | L | L | L | L | L |
|  | L | L | H | L | L |
|  | H | L | L | L | L |
|  | H | L | H | L | H |
| Setting mode | L | L | L | L | L |
|  | L | H | H | L | L |
|  | L | H | L | H | L |
|  | L | H | H | H | H |

*Figure 4*

MOTOR DRIVER WITH MULTIPURPOSE PIN

CROSS-REFERENCE TO RELATED APPLICATIONS

The present application is a continuation application of the earlier U.S. patent application Ser. No. 15/654,365 to Harashima et al, entitled, "Motor Driver with Multipurpose Pin," filed Jul. 19, 2017, which claimed priority to U.S. Provisional Patent Application No. 62/368,949, filed Jul. 29, 2016 by Takashi HARASHIMA, et al. and entitled "MULTI-FUNCTION FREQUENCY GENERATION PIN," the disclosures of each of which are incorporated entirely herein by reference.

BACKGROUND

A motor driver couples to a motor to provide one or more control signals to the motor to control operation of the motor. To provide the controls signals to the motor, and to receive feedback related to the motor, the motor driver may include a plurality of pins. More pins on the motor driver may result in a larger physical size of the motor driver, increased complexity of the motor driver, or increased manufacturing cost of the motor driver.

SUMMARY

In an embodiment, a motor driver comprises a multipurpose pin operable to couple the motor driver to a controller and judgment logic coupled to the multipurpose pin. The motor driver is operable to receive an input signal via the multipurpose pin and may be operable in a normal operation mode or a setting operation mode. The judgment logic may be operable to detect whether a prescribed pattern is present in the input signal, wherein the prescribed pattern indicates one of the normal operation mode or the setting operation mode, control at least a portion of the motor driver to operate in the setting operation mode when the prescribed pattern is detected in the input signal, and control at least the portion of the motor driver to operate in the normal operation mode when the prescribed pattern is not detected in the input signal.

In another embodiment, a system comprises a motor driver operable to couple to a motor and drive the motor and a controller coupled to the motor driver and operable to control the motor driver. The motor driver may comprise a multipurpose pin, may be operable to receive input from the controller via the multipurpose pin during a setting operation mode of the motor driver, and may be operable to output a frequency generator (FG) signal to the controller via the multipurpose pin during a normal operation mode of the motor driver.

In yet another embodiment, a method comprising beginning, by judgment logic of a motor driver, mode judgment, determining, by the judgment logic, whether a predetermined period of time for performing mode judgment has occurred, detecting whether a prescribed signal comprising an indication of an operation mode for the motor driver is included in an input signal received by the motor driver, and determining the operation mode of the motor driver according to whether the prescribed signal comprising the indication of the operation mode for the motor driver is detected in the input signal received by the motor driver.

BRIEF DESCRIPTION OF THE DRAWINGS

There are disclosed in the drawings and in the following description various embodiments for a motor driver with a multipurpose pin. In the drawings:

FIG. 4 is a table of input and output signal relationships in accordance with various embodiments.

Figure 1:
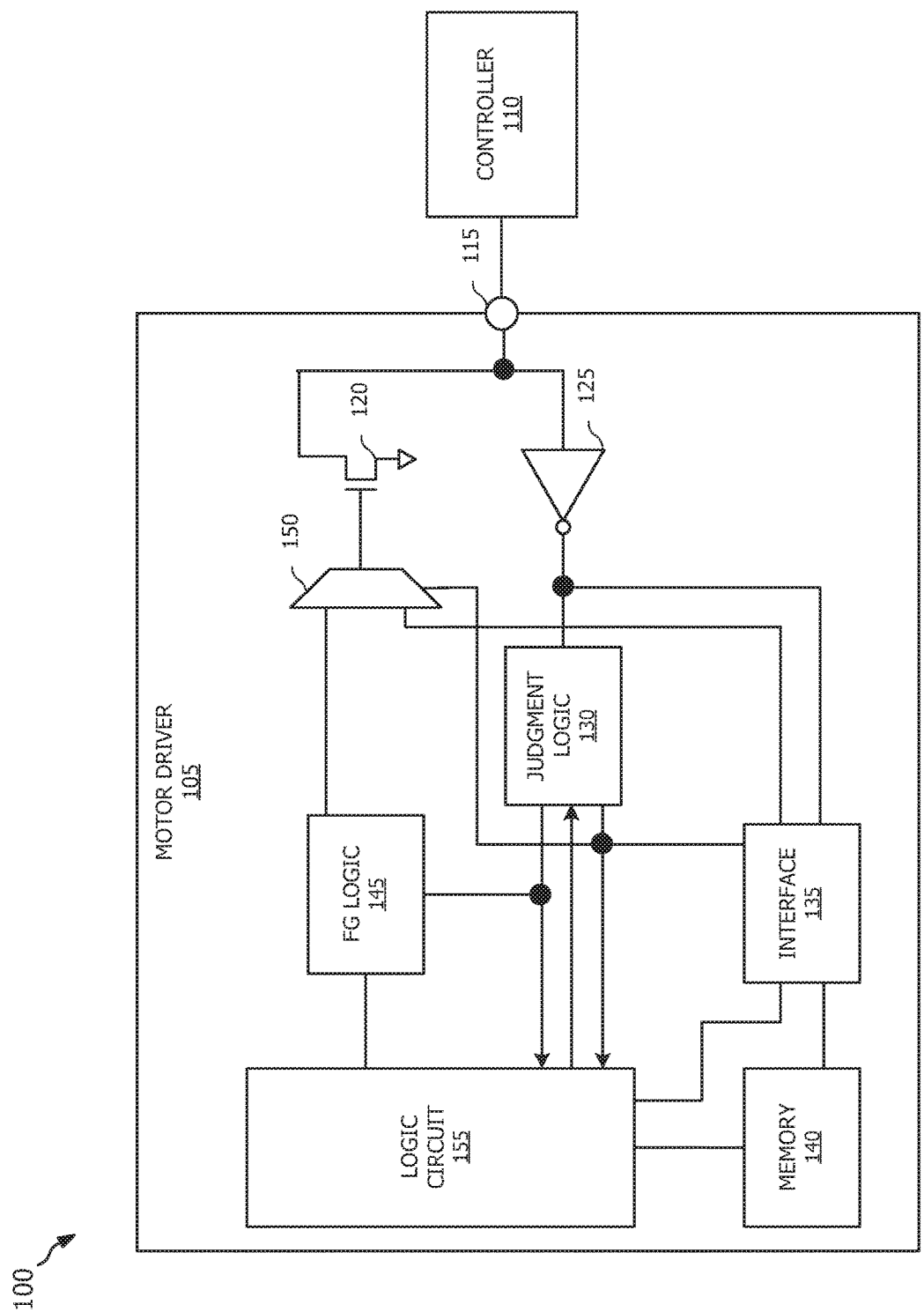
FIG. 1 is a schematic diagram of a system implementing a motor driver in accordance with various embodiments.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are embodiments that provide for multifunctional serial control of a motor driver using a single multipurpose pin of an electrical component package of the motor driver. The electrical component package may at least partially contain the motor driver and may include one or more pins (including, for example, the single multipurpose pin) as electrically conductive paths for coupling devices outside of the electrical component package to the motor driver. The motor driver may be at least partially contained within the electrical component package. The motor driver may be operable to couple to other devices such as a motor that may be driven by the motor driver and/or a controller that may control at least some operations and/or functions of the motor driver. In some embodiments, the motor driver may be operable to, via the multipurpose pin, output a FG signal and input (or output) serial data for storing data to the motor driver (or reading data from the motor driver). In some embodiments, the motor driver may be further operable to, via the multipurpose pin, determine a mode of operation for the motor driver desired by a controller coupled to the motor driver via the multipurpose pin. Enabling the motor driver to perform multiple operations via the single multipurpose pin may improve over prior art motor drivers by reducing a size of the motor driver or of the electrical component package, reducing a power consumption of the motor driver, reducing a manufacturing cost for manufacturing the motor driver, and/or providing increased flexibility in implementing the motor driver to control a motor.

Turning now to FIG. 1, a schematic diagram of a system 100 implementing a motor driver 105 in accordance with various embodiments is shown. The motor driver 105 may be coupled to, or may be operable to couple to, a controller 110, a motor (not shown), and one or more other components (not shown) that may receive output from, or provide input to, the motor driver 105. In at least some embodiments, the motor driver 105 may be coupled to the controller 110 via a multipurpose pin 115. The multipurpose pin 115 may enable the motor driver to receive input (e.g., such as serial data) from the controller 110 and provide an output to the controller 110. In some embodiments, the multipurpose pin 115 may be referred to as a FG pin. The multipurpose pin 115 (and correspondingly, the motor driver 105) may be described as having a normal operation mode and a setting operation mode. The motor driver 105 may determine whether the multipurpose pin 115 should operate in the normal operation mode or the setting operation mode at least partially based on whether a prescribed signal is received at the multipurpose pin 115 within a period of time allotted for receipt of a mode control signal. The period of time allotted for receipt of a mode control signal may, for example, begin and extend from a time at which the motor driver transitions from a powered-off state to a powered-on state.

As shown in FIG. 1, the motor driver 105 may comprise transistor 120, inverter 125, judgment logic 130, interface 135, memory 140, FG logic 145, multiplexer 150, and logic circuit 155. In various embodiments, the motor driver 105 may further comprise one or more other elements (not shown) that may be operable to enable driving of the motor by the motor driver 105 (for example, by receiving and/or processing input, processing and/or transmitting output, etc.). In some embodiments, the inverter 125 may couple an input of the judgment logic 130 and the interface 135 to the multipurpose pin 115. An output of the multiplexer 150 may be further coupled to the multipurpose pin 115 via the transistor 120. The transistor 120, in some embodiments (such as shown in FIG. 1), may be a field effect transistor (FET) configured in an open-drain configuration in which a drain terminal of the transistor 120 is coupled to the multipurpose pin 115, a source terminal of the transistor 120 is coupled to a ground voltage potential, and a gate terminal of the transistor 120 is coupled to an output of the multiplexer 150. In other embodiments, the transistor 120 may be of any suitable construction or style and may be configured according to any suitable configuration.

In some embodiments, the interface 135 may be further coupled to the memory 140, logic circuit 155, judgment logic 130, and to a signal input of the multiplexer 150. The memory 140 may be coupled to the interface 135 and the logic circuit 155. The judgment logic 130 may be further coupled to the logic circuit 155, a control input of the multiplexer 150, and the FG logic 145. The FG logic 145 may be further coupled to the logic circuit 155 and a signal input of the multiplexer 150.

As discussed above, in various embodiments the motor driver 105 may include at least a normal operation mode and a setting operation mode. Operation in the normal operation mode or the setting operation mode may be signaled to the motor driver 105 at least via the multipurpose pin 115 (e.g., signaled by the controller 110). In some embodiments, the signaling may be indicated by receipt of the prescribed signal (e.g., a signal having a prescribed pattern or sequence of bits) by the motor driver 105 via the multipurpose pin 115.

The judgment logic 130 may determine whether the prescribed signal is included in any signaling received by the motor driver 105 via the multipurpose pin 115. For example, the judgment logic 130 may monitor the multipurpose pin 115 for input within a predetermined period of time following powering on of the motor driver 105 and/or the system 100. The predetermined period of time may be, for example, about 5 milliseconds (ms), about 7 ms, about 10 ms, or any other suitable time period that allows for receipt of the prescribed signal and that may be determined according to a particular construction of an electrical circuit (e.g., an integrated circuit) that includes the motor driver 105.

When the judgment logic 130 determines that the prescribed signal is present in an input signal received by the motor driver 105 at the multipurpose pin 115 during the predetermined period of time, the judgment logic 130 may output a setting mode enable signal. In some embodiments, the setting mode enable signal may indicate to at least one other component in the motor driver 105 that the motor driver 105 is to operate in the setting operation mode. When the motor driver 105 operates in the setting operation mode, the interface 135 may receive input from the multipurpose pin 115 via the inverter 125 such that a value of the input when received at the interface 135 is an inverse of a value of the input when received at the multipurpose pin 115. The interface 135, in some embodiments, may provide the input received from the inverter 125 to the memory 140 for storage by the memory 140 as stored data. The stored data may be, in some embodiments, an output duty cycle (e.g., a pulse width modulation (PWM) duty cycle), a minimum speed, a soft start (e.g., gradual start) time, a soft switch width, a lock protection time, a tachometer selection signal, a lock detection signal, or other configurable features or functions of the motor driver 105 or relating to operation of the motor to which the motor driver 105 is coupled. In some embodiments, the interface 135 may further provide the input received by the interface 135 to the logic circuit 155 (e.g., as serial data) for use by the logic circuit, for example, for trial driving of the motor.

In some embodiments, the logic circuit 155 may read the stored data from the memory 140 and output the stored data back to the controller 110 via the multipurpose pin 115 for verification that the stored data is correct (e.g., such that the data was not altered or corrupted from an intended value in the storing process). For example, the logic circuit 155 may read the stored data from the memory 140 and transmit the stored data to the interface 135. In other embodiments, the interface 135 may read the stored data from the memory 140 and output the stored data back to the controller 110 via the multipurpose pin 115 in addition to, or in place of, the logic circuit 155. The interface 135 may transmit the stored data to the multiplexer 150 for output to the controller 110 via the multipurpose pin 115 and transistor 120. In some embodiments, the control input of the multiplexer 150 may be coupled to the judgment logic 130 such that the setting mode enable signal output by the judgment logic 130 controls selection of an input of the multiplexer 150 for output by the multiplexer 150. For example, when the setting mode enable signal is high (e.g., the motor driver 105 is in the setting operation mode) the multiplexer 150 may output an input received from the interface 135 (e.g., such as the stored data as discussed above).

When the judgment logic 130 determines that the prescribed signal is not present in the input signal received by the motor driver 105 at the multipurpose pin 115 during the predetermined period of time, the judgment logic 130 may output a normal mode enable signal. In some embodiments, the normal mode enable signal may indicate to at least one other component in the motor driver 105 that the motor driver 105 is to operate in the normal operation mode. When the motor driver 105 operates in the normal operation mode, the FG logic 145 may receive input from the logic circuit 155 and provide an output at least partially based on the received input to the multiplexer 150 for output via the multipurpose pin 115 and transistor 120. The output, in some embodiments, may provide information about a state of the motor coupled to the motor driver 105. For example, the output may indicate a rotational state of the motor.

Figure 2:
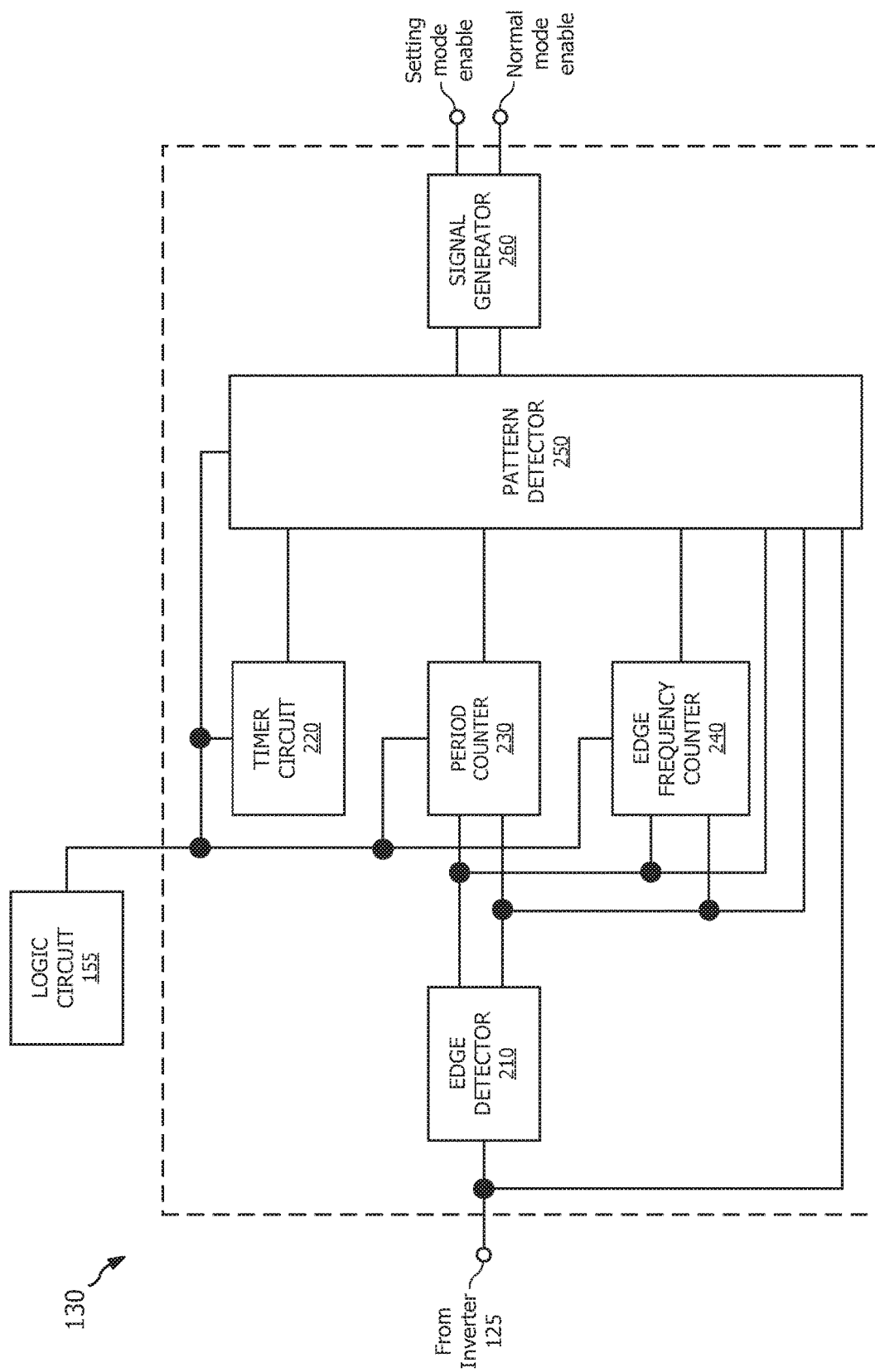
FIG. 2 is a schematic diagram of judgment logic in accordance with various embodiments.

Turning now to FIG. 2, a schematic diagram of the judgment logic 130 in accordance with various embodiments is shown. In some embodiments, the judgment logic 130 may comprise an edge detector 210, a timer circuit 220, a period counter 230, an edge frequency counter 240, a pattern detector 250, and a signal generator 260. The judgment logic 130 may be coupled to the logic circuit 155 and may receive a judgment start signal from the logic circuit 155. The judgment start signal, in some embodiments, indicates to the judgment logic 130 (and correspondingly, to the timer circuit 220, period counter 230, edge frequency counter 240, and pattern detector 250) to begin determining whether the prescribed signal is received by the judgment logic 130 within the predetermined period of time. When the timer circuit 220 receives the judgment start signal from the logic circuit 155, the timer circuit 220 may initiate a timer or a counter (e.g., a timer beginning at a predetermined time and counting down to zero or a timer beginning at zero and counting up to the predetermined time) to enable the judgment logic 130 to determine whether the prescribed signal is received within the predetermined time. When the timer circuit 220 determines that the predetermined time has expired (e.g., when the timer reaches zero or the predetermined time), the timer circuit 220 may output a timeout signal to the pattern detector 250 indicating that the predetermined time has expired. The timeout signal, in some embodiments, may indicate to the pattern detector 250 to cease detecting whether the prescribed signal is received by the judgment logic 130 until the pattern detector 250 receives another judgment start signal.

The judgment logic 130 may receive input from the inverter 125 at the edge detector 210. The input may be, for example, a multi-bit binary signal such that the signal includes positive edges (transitions from a binary "0" or low to a binary "1" or high) and negative edges (transitions from a binary "1" or high to a binary "0" or low). Based on the input, the edge detector 210 may determine whether the edge of the signal is a positive edge (e.g., a rising edge) or a negative edge (e.g., a falling edge). The edge detector 210 may provide an output indicating whether a positive edge or a negative edge is detected in the input to the period counter 230, edge frequency counter 240, and the pattern detector 250. The period counter 230, in some embodiments, may begin a counter or timer upon receipt of a signal indicating a detected positive edge in the input received by the judgment logic 130. When the period counter 230 receives a signal indicating a detected negative edge in the input received by the judgment logic 130, the period counter 230 may stop the counter or timer and provide a count value or time of the period of the input received by the judgment logic 130 to the pattern detector 250.

The edge frequency counter 240 may count a frequency of edge changes in the input received by the judgment logic 130. For example, when the edge frequency counter 240 receives the judgment start signal, the edge frequency counter 240 may reset a count value to zero. The edge frequency counter 240 may then begin incrementing the count value by 1 for each signal received by the edge frequency counter 240 indicating a detected positive edge or negative edge in the input received by the judgment logic 130. The pattern detector 250 may receive the judgment start signal, timeout signal, count value or time of the period, and edge frequency count and, from receipt of the judgment start signal until receipt of the timeout signal, may determine whether the prescribed signal is received by the judgment logic 130. The pattern detector 250 may perform the determination or detection at least partially according to the count value or time of the period and the edge frequency count. When the prescribed pattern is detected within the predetermined period of time, the pattern detector 250 may provide a signal to the signal generator 260 indicating that the prescribed pattern has been detected. When the prescribed pattern is not detected within the predetermined period of time, the pattern detector 250 may provide a signal to the signal generator 260 indicating that the prescribed pattern has not been detected. Based on the signals received from the pattern detector 250, the signal generator 260 may generate and output the setting mode enable signal and/or the normal mode enable signal.

Figure 3:
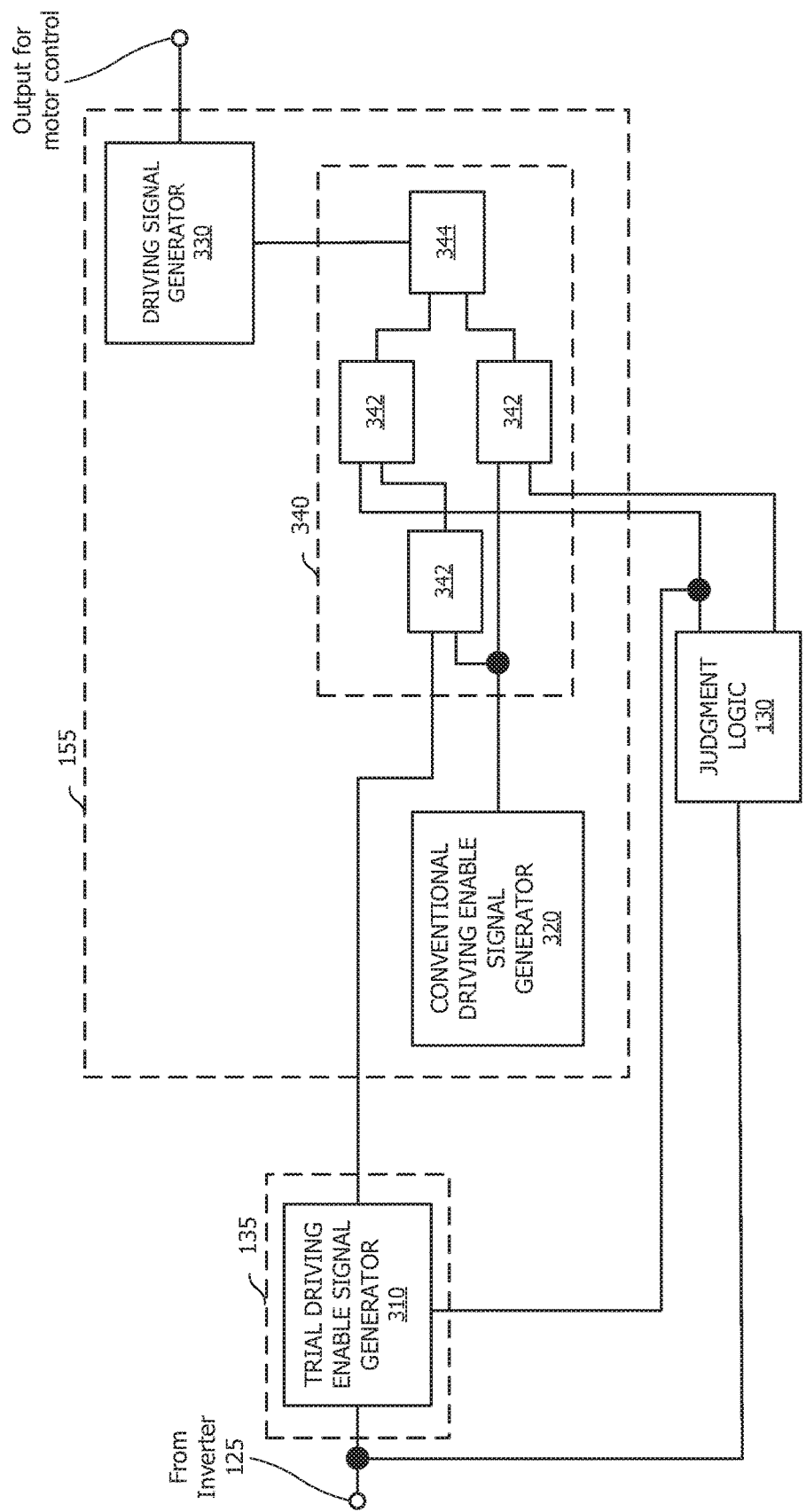
FIG. 3 is a schematic diagram of an interface and logic circuit in accordance with various embodiments.

Turning now to FIG. 3, a schematic diagram of the interface 135 and logic circuit 155 in accordance with various embodiments is shown. In some embodiments, the interface 135 may include a trial driving enable signal generator 310. In some embodiments, the logic circuit 155 may include a conventional driving enable signal generator 320, a driving signal generator 330, and an enable signal controller 340. The enable signal controller 340, in some embodiments, may comprise a plurality of digital logic AND gates 342 and a digital logic OR gate 344. When the interface 135 receives an input signal from the inverter 125 of FIG. 1 and the motor driver 105 is operating in the setting operation mode, the trial driving enable generator may generate a trial driving enable signal at least partially based on the input signal received from the inverter 125 and may provide the trial driving enable signal to the enable signal controller 340. In an embodiment, the conventional driving enable signal generator 320 may generate a conventional driving enable signal and provide the conventional driving enable signal to the enable signal controller 340. In an embodiment, the enable signal controller 340 may further receive the setting mode enable signal and normal mode enable signal from the judgment logic 130. Each of the signals received by the enable signal controller 340 may be a binary signal and the enable signal controller 340 may generate a final driving enable signal according to the AND gates 342 and OR gate 344. FIG. 4 illustrates a table of input and output signal relationships for the enable signal controller 340 in accordance with various embodiments. Returning to FIG. 3, the enable signal controller 340 may provide the final driving enable signal to the driving signal generator 330 and the driving signal generator may generate a driving signal for output by the logic circuit 155 to control a motor.

Figure 5:
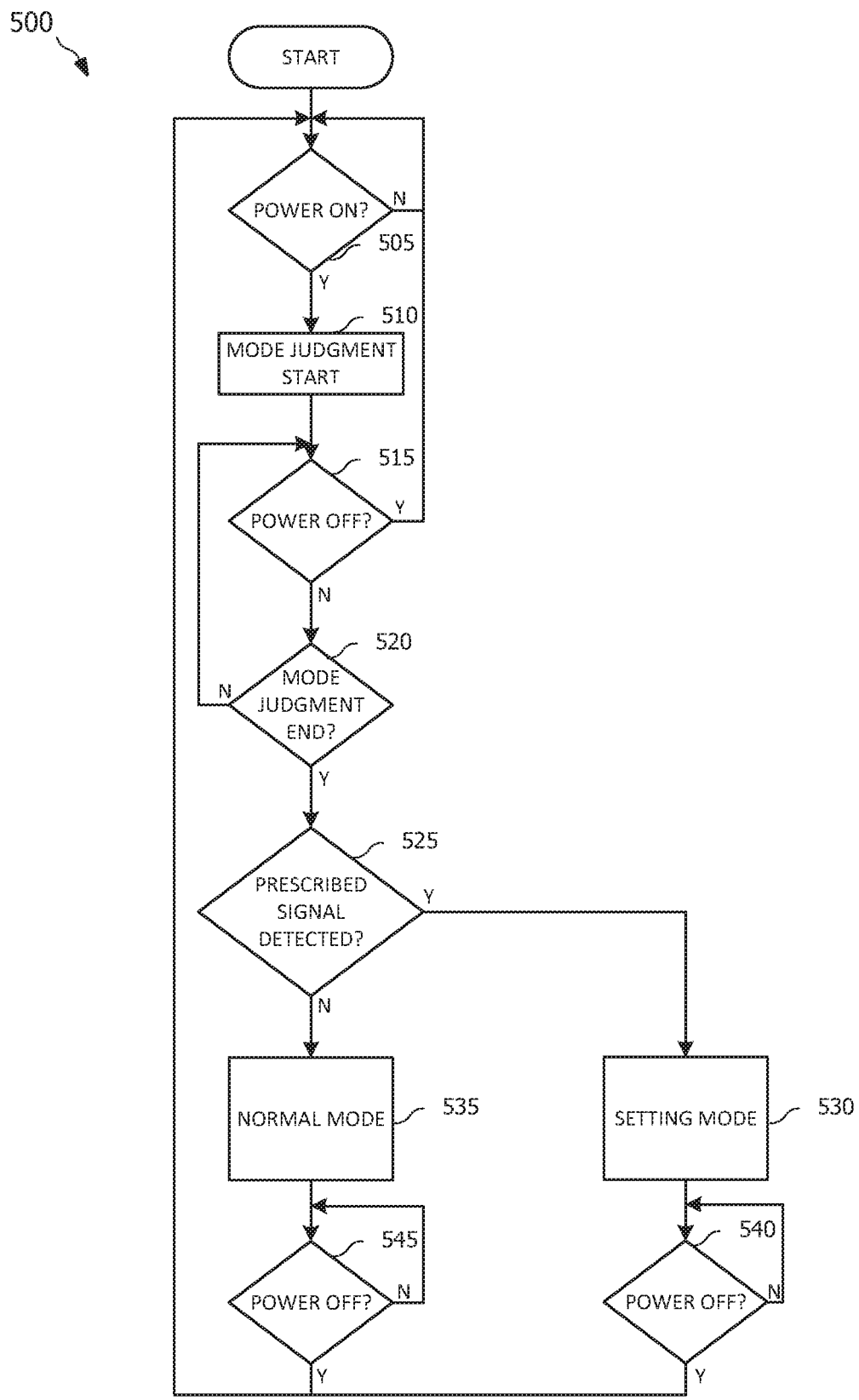
FIG. 5 is a flowchart of a method for motor driver operation mode selection in accordance with various embodiments.

Turning now to FIG. 5, a flowchart of a method 500 for motor driver operation mode selection in accordance with various embodiments is shown. The method 500 may be implemented, for example, by the motor driver 105 (e.g., at least partially via the judgment logic 130) to determine and/or select an operation mode (e.g., normal operation mode or setting operation mode) for the motor driver 105. At operation 505, when the motor driver 105 has been powered on (e.g., either power has been turned on when it was previously off or the motor driver 105 is restarted), the motor driver 105 proceeds to operation 510. When the motor driver has not been powered on, the method 500 remains at operation 505.

At operation 510, the motor driver 105 begins mode judgment. For example, the motor driver 105 may begin the mode judgment by transmitting a judgment start signal to one or more components of the motor driver 105 as discussed above with reference to FIG. 2. In some embodiments, the mode judgment may be performed by the judgment logic 130 of the motor driver 105. In some embodiments, the mode judgment may continue for about 5 ms, about 7 ms, about 10 ms, or any other suitable time period that allows for receipt of the prescribed signal and that may be determined according to a particular construction of an electrical circuit (e.g., an integrated circuit) that includes the motor driver 105. The judgment start signal may be transmitted, in some embodiments, from the logic circuit 155 of the motor driver 105 to the judgment logic 130 of the motor driver 105. When the motor driver 105 has been powered off after beginning mode judgment, at operation 515 the method 500 returns to operation 505. When the motor driver 105 has not been powered off after beginning mode judgment, at operation 515 the method 500 proceeds to operation 520.

At operation 520, the method 500 determines whether mode judgment has ended. For example, mode judgment may end at the expiration of a predetermined period of time, as discussed above with reference to FIG. 2. When the mode judgment has ended, either after receipt of the prescribed signal or without receipt of the prescribed signal, the method 500 proceeds to operation 525. When the mode judgment has not ended, the method 500 returns to operation 515. At operation 525, the method 500 determines (e.g., via at least the judgment logic 130) whether the prescribed signal has been detected in input received by the motor driver 105. When the prescribed signal has been detected, the method 500 proceeds to operation 530. When the prescribed signal has not been detected, the method 500 proceeds to operation 535.

At operation 530, the motor driver 105 enters the setting operation mode. For example, after the judgment logic 130 has determined that the prescribed signal has been detected at operation 525, at operation 530 the judgment logic 130 may transmit a setting mode enable signal to one or more components of the motor driver 105 to instruct the one or more components to operate in the setting operation mode. When the motor driver 105 has been powered off after entering the setting operation mode, at operation 540 the method 500 returns to operation 505. When the motor driver 105 has not been powered off after entering the setting operation mode, at operation 540 the method 500 returns to operation 540.

At operation 535 the motor driver 105 enters the normal operation mode. For example, after the judgment logic 130 has determined that the prescribed signal has not been detected at operation 525, at operation 535 the judgment logic 130 may transmit a normal mode enable signal to one or more components of the motor driver 105 to instruct the one or more components to operate in the normal operation mode. When the motor driver 105 has been powered off after entering the normal operation mode, at operation 545 the method 500 returns to operation 505. When the motor driver 105 has not been powered off after entering the normal operation mode, the method 500 remains at operation 545.

Figure 6:
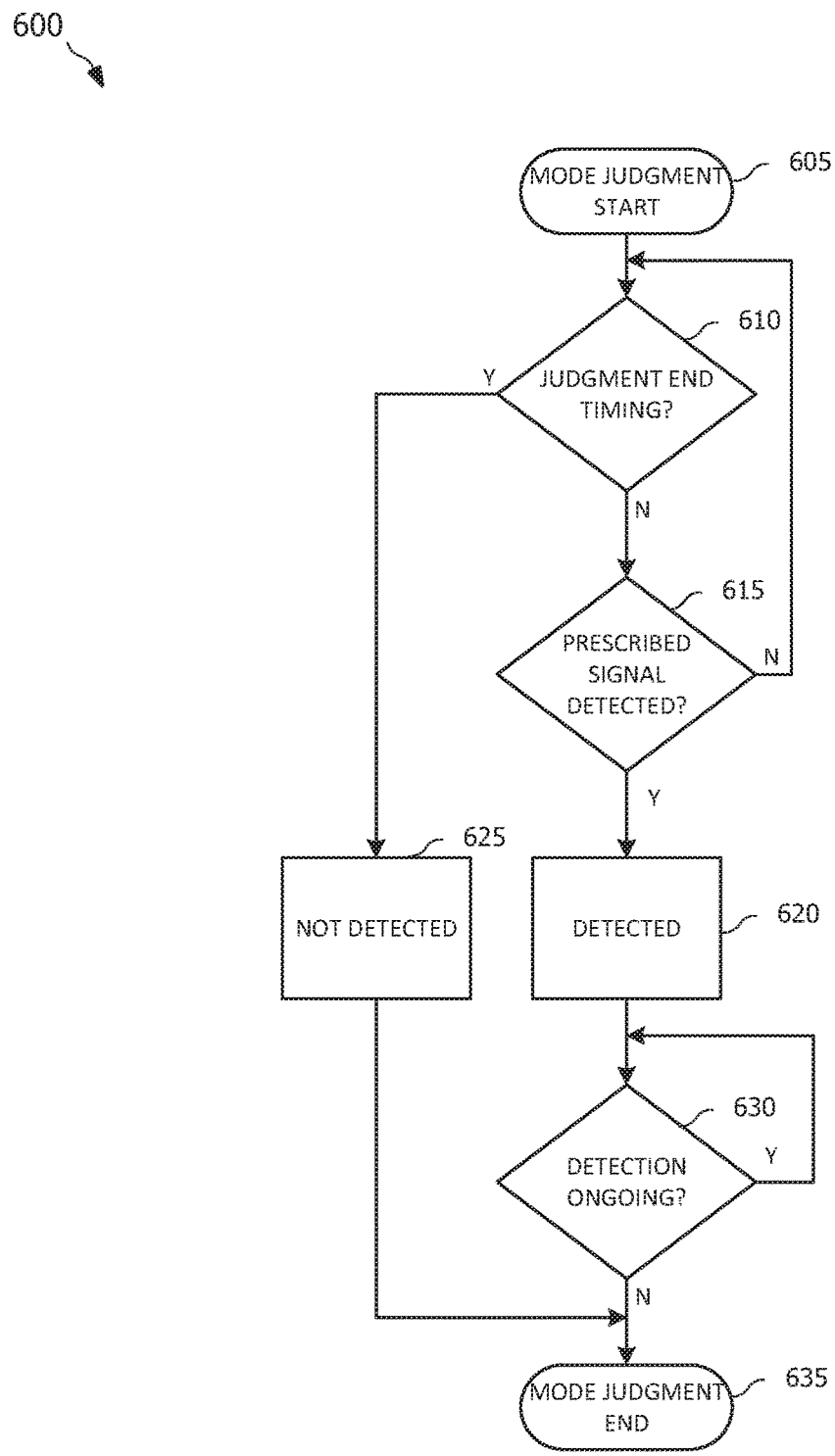
FIG. 6 is a flowchart of a method for motor driver operation mode judgment in accordance with various embodiments.

Turning now to FIG. 6, a flowchart of a method 600 for motor driver operation mode judgment in accordance with various embodiments is shown. The method 600 may be implemented, for example, by the judgment logic 130 to determine an operation mode (e.g., normal operation mode or setting operation mode) for the motor driver 105 according to an input signal received by the motor driver 105.

At operation 605, the judgment logic 130 begins mode judgment. For example, in response to receipt of a judgment start signal (e.g., such as a judgment start signal received from logic circuit 155, as discussed above), the judgment logic 130 may begin determining whether the prescribed signal has been (or is currently being) received by the judgment logic 130 (and correspondingly, the motor driver 105). At operation 610, the judgment logic 130 determines whether the end of a predetermined period of time for detecting whether the prescribed signal has been received (or for performing mode judgment) has occurred. The predetermined period of time may be a period of time of about 5 ms, about 7 ms, about 10 ms, or any other suitable time period that allows for receipt of the prescribed signal and that may be determined according to a particular construction of an electrical circuit (e.g., an integrated circuit) that includes the motor driver 105.

When the end of the predetermined period of time for detecting whether the prescribed signal has been received has occurred, the method 600 proceeds to operation 625. At operation 625, the judgment logic 130 determines that the prescribed signal has not been received and the method 600 proceeds to operation 635. Returning to operation 610, when the end of the predetermined period of time for detecting whether the prescribed signal has been received has not occurred, the method 600 proceeds to operation 615. At operation 615, the judgment logic 130 determines whether the prescribed signal has been detected in input received by the judgment logic 130. When the prescribed signal has been detected, the method 600 proceeds to operation 620. When the prescribed signal has not been detected, the method 600 returns to operation 610.

At operation 620, the judgment logic 130 determines that the prescribed signal has been detected during the predetermined time period. In some embodiments, the prescribed signal may be included a plurality of times in a serial communication received by the judgment logic 130 and correspondingly the motor driver 105. In other embodiments, it may be desirable to hold the motor driver 105 in a mode judgment operation, for example, to prevent and/or avoid the prescribed pattern being interpreted as serial communication intended for processing and/or storage by the motor driver 105. For example, in some embodiments, the prescribed signal may be received by the judgment logic 130 a plurality of times (e.g., about 20 times) to provide multiple opportunities for the judgment logic 130 to detect the existence of the prescribed signal. In such embodiments, the method 600 may optionally further comprise operation 630.

At operation 630, the judgment logic 130 determines whether detection of the prescribed signal is ongoing. For example, the judgment logic 130 may determine that a periodically (or aperiodically) repeating series of the prescribed signal is being received by the judgment logic 130. In such embodiments, the judgment logic 130 may remain at operation 630 (e.g., in the mode judgment operation) until detection of the prescribed signal is no longer ongoing (e.g., the judgment logic 130 ceases receiving the prescribed signal). When detection is not ongoing, the method 600 may proceed to operation 635 at which the judgment logic 130 determines that mode judgment has ended.

Figure 7:
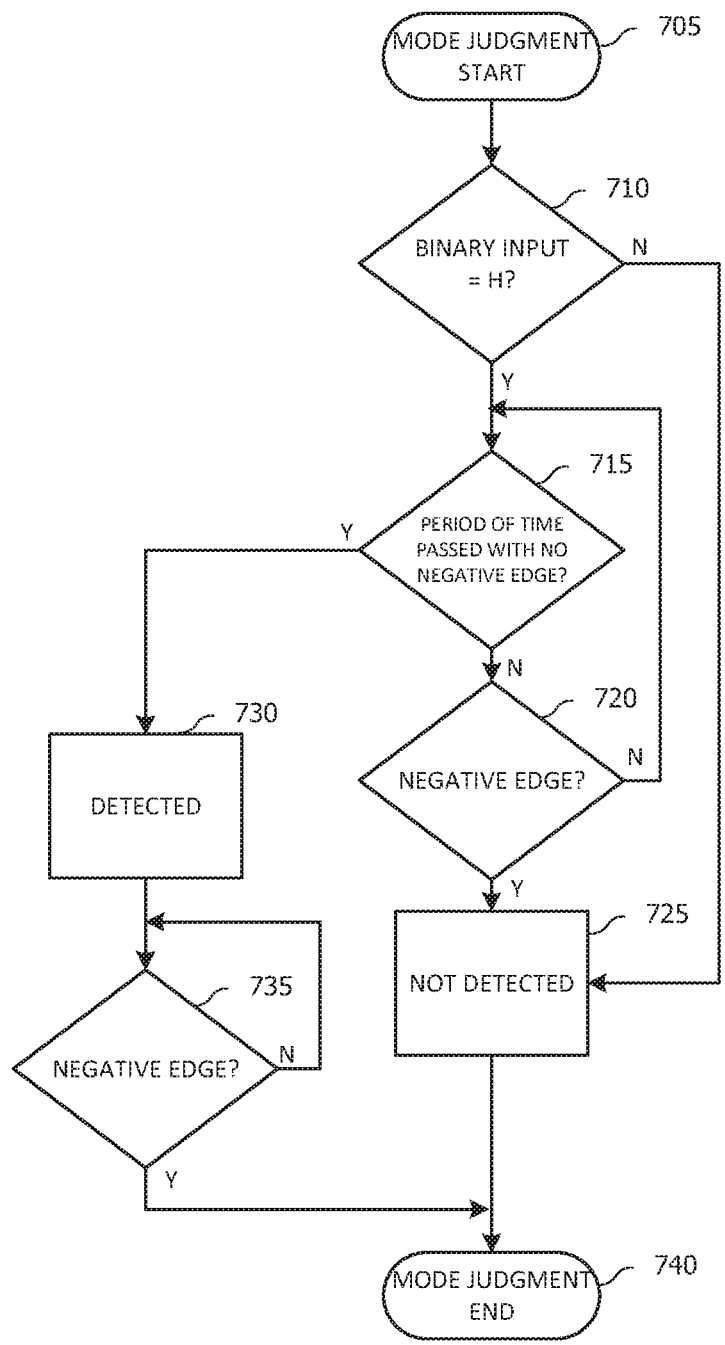
FIG. 7 is a flowchart of another method for motor driver operation mode judgment in accordance with various embodiments.

Turning now to FIG. 7, a flowchart of another method 700 for motor driver operation mode judgment in accordance with various embodiments is shown. The method 700 may be implemented, for example, by the judgment logic 130 to determine an operation mode (e.g., normal operation mode or setting operation mode) for the motor driver 105 according to an input signal received by the motor driver 105. The operation mode may be determined, for example, based on a binary transition in an input signal of the judgment logic 130 occurring, or not occurring, during a predefined period of time.

At operation 705, the judgment logic 130 begins mode judgment. For example, in response to receipt of a judgment start signal (e.g., such as a judgment start signal received from logic circuit 155, as discussed above). At operation 710, the judgment logic 130 may determine whether a signal at a high binary or logic level is being received by the judgment logic 130. When a signal at a high binary or logic level is being received by the judgment logic 130, the method 700 proceeds to operation 715. When a signal at a high binary or logic level is not being received by the judgment logic 130, the method 700 proceeds to operation 725.

At operation 715, the judgment logic 130 determines whether a predefined amount of time has elapsed without a negative edge in the signal (e.g., a predefined amount of time has elapsed without the signal changing from the high binary or logic level to a low binary or logic level). When the predefined amount of time has not elapsed without a negative edge in the signal (e.g., a negative edge in the signal occurring during the predefined amount of time), the method 700 proceeds to operation 720. At operation 720, the judgment logic 130 determines whether a negative edge has occurred in the signal. When a negative edge has not occurred in the signal, the method 700 returns to operation 715. When a negative edge has occurred in the signal, the method 700 proceeds to operation 725. At operation 725, the judgment logic 130 determines that the prescribed pattern has not been detected and proceeds to operation 740.

Returning now to operation 715, when the predefined amount of time has elapsed without a negative edge in the signal, the method 700 proceeds to operation 730. At operation 730, the judgment logic 130 determines that the prescribed pattern has been detected. In some embodiments, the method 700 may optionally further comprise operation 735. In such embodiments, the method 700 may proceed from operation 730 to operation 735. At operation 735, the judgment logic 130 determines whether a negative edge has occurred in the signal. When a negative edge has not occurred in the signal, the method 700 returns to operation 735. When a negative edge has occurred in the signal, the method 700 proceeds to operation 740. At operation 740, the judgment logic 130 determines that mode judgment has ended.

Figure 8:
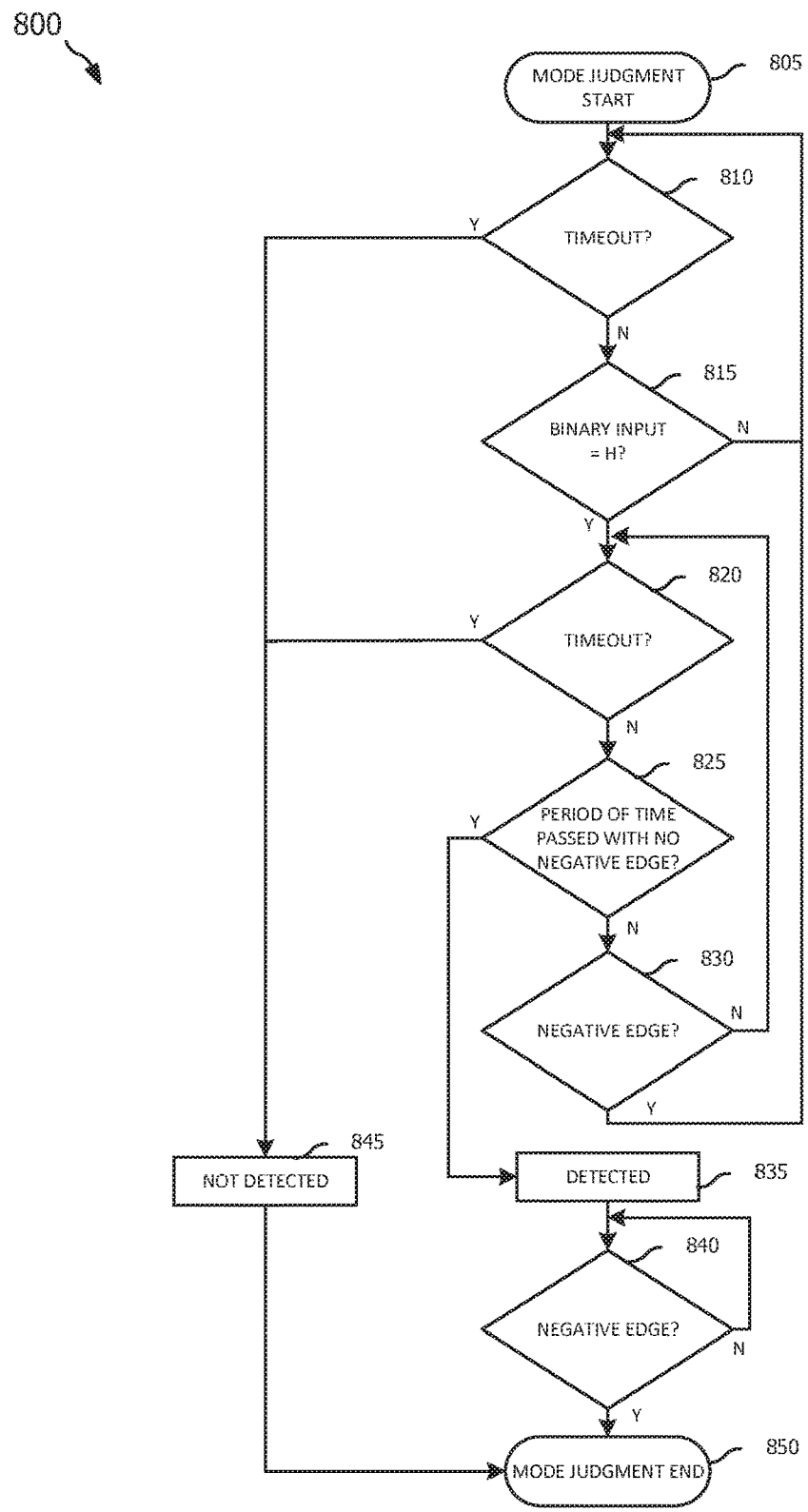
FIG. 8 is a flowchart of another method for motor driver operation mode judgment in accordance with various embodiments.

Turning now to FIG. 8, a flowchart of another method 800 for motor driver operation mode judgment in accordance with various embodiments is shown. The method 800 may be implemented, for example, by the judgment logic 130 to determine an operation mode (e.g., normal operation mode or setting operation mode) for the motor driver 105 according to an input signal received by the motor driver 105. The operation mode may be determined, for example, based on a binary transition in an input signal of the judgment logic 130 occurring, or not occurring, during a predefined period of time.

At operation 805, the judgment logic 130 begins mode judgment. For example, in response to receipt of a judgment start signal (e.g., such as a judgment start signal received from logic circuit 155, as discussed above). At operation 810, the judgment logic 130 may determine whether a timeout condition has been met. The timeout condition may indicate, for example, that an elapsed amount of time since beginning the mode judgment at operation 805 has exceeded the predetermined time for determining whether the prescribed signal is present. When the timeout condition has not been met, the method 800 proceeds to operation 815. When the timeout condition has been met, the method 800 proceeds to operation 845. At operation 845, the judgment logic 130 determines that the prescribed pattern has not been detected and proceeds to operation 850.

Returning to operation 815, the judgment logic 130 may determine whether a signal at a high binary or logic level is being received by the judgment logic 130. When a signal at a high binary or logic level is being received by the judgment logic 130, the method 800 proceeds to operation 820. When a signal at a high binary or logic level is not being received by the judgment logic 130, the method 800 returns to operation 810.

At operation 820, the judgment logic 130 may determine whether the timeout condition (e.g., as discussed with respect to operation 810) has been met. When the timeout condition has not been met, the method 800 proceeds to operation 825. When the timeout condition has been met, the method 800 proceeds to operation 845. At operation 825, the judgment logic 130 determines whether a predefined amount of time has elapsed without a negative edge in the signal (e.g., a predefined amount of time has elapsed without the signal changing from the high binary or logic level to a low binary or logic level). When the predefined amount of time has not elapsed without a negative edge in the signal (e.g., a negative edge in the signal occurring during the predefined amount of time), the method 800 proceeds to operation 830. At operation 830, the judgment logic 130 determines whether a negative edge has occurred in the signal. When a negative edge has not occurred in the signal, the method 800 returns to operation 820. When a negative edge has occurred in the signal, the method 800 returns to operation 810.

Returning now to operation 825, when the predefined amount of time has elapsed without a negative edge in the signal, the method 800 proceeds to operation 835. At operation 835, the judgment logic 130 determines that the prescribed pattern has been detected and proceeds to operation 840. At operation 840, the judgment logic 130 may determine whether a negative edge has occurred in the signal. When a negative edge has not occurred in the signal, the method 800 returns to operation 840. When a negative edge has occurred in the signal, the method 800 proceeds to operation 850. At operation 850, the judgment logic 130 determines that mode judgment has ended.

Figure 9:
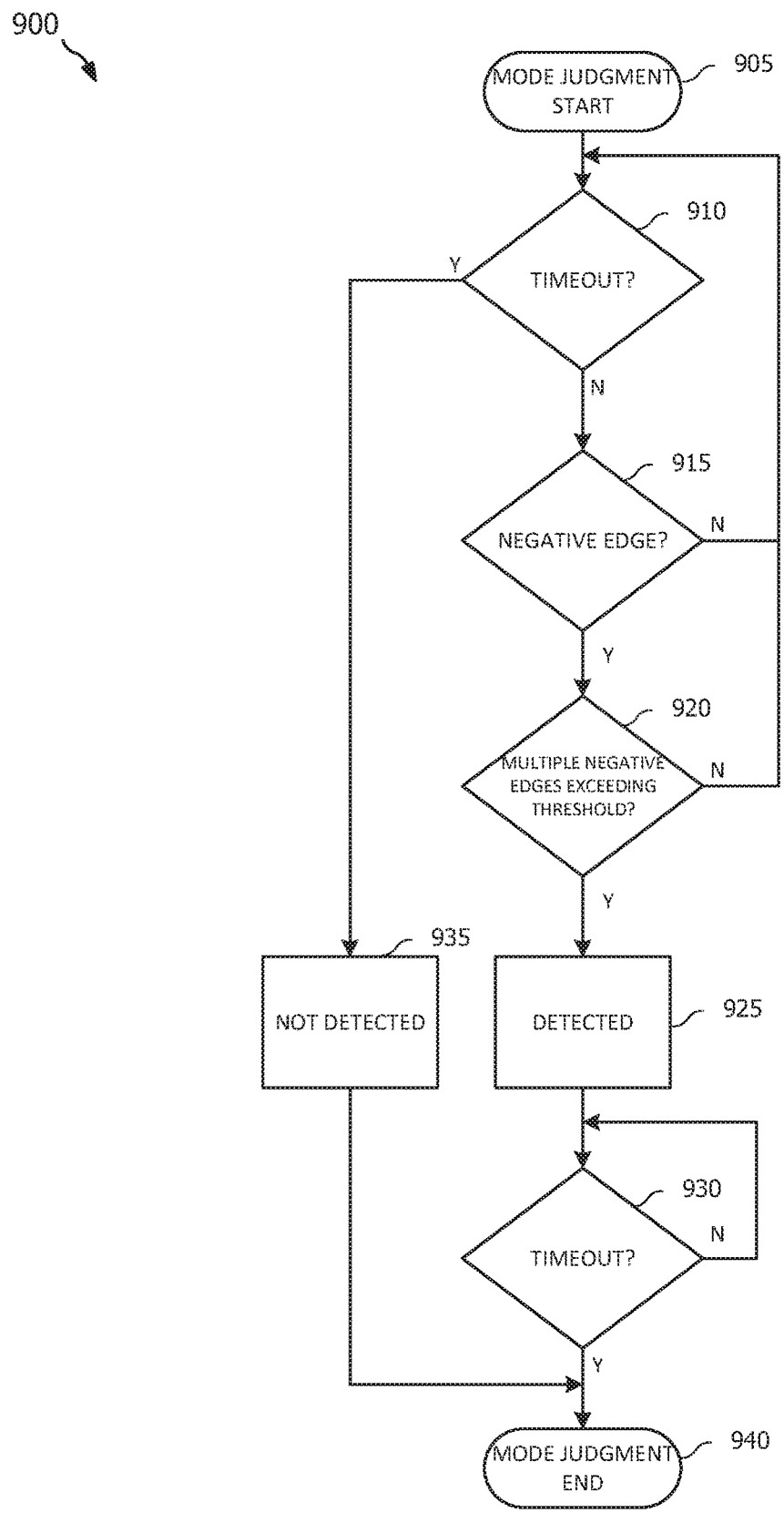
FIG. 9 is a flowchart of another method for motor driver operation mode judgment in accordance with various embodiments.

Turning now to FIG. 9, a flowchart of another method 900 for motor driver operation mode judgment in accordance with various embodiments is shown. The method 900 may be implemented, for example, by the judgment logic 130 to determine an operation mode (e.g., normal operation mode or setting operation mode) for the motor driver 105 according to an input signal received by the motor driver 105. The operation mode may be determined, for example, based on a plurality of binary transitions in an input signal of the judgment logic 130 occurring, or not occurring, during a predefined period of time.

At operation 905, the judgment logic 130 begins mode judgment. For example, in response to receipt of a judgment start signal (e.g., such as a judgment start signal received from logic circuit 155, as discussed above). At operation 910, the judgment logic 130 may determine whether a timeout condition has been met. The timeout condition may indicate, for example, that an elapsed amount of time since beginning the mode judgment at operation 905 has exceeded the predetermined time for determining whether the prescribed signal is present. When the timeout condition has not been met, the method 900 proceeds to operation 915. When the timeout condition has been met, the method 900 proceeds to operation 935. At operation 935, the judgment logic 130 determines that the prescribed pattern has not been detected and proceeds to operation 940.

Returning to operation 915, the judgment logic 130 may determine whether a negative edge has occurred in the input signal. When a negative edge has not occurred in the input signal, the method 900 returns to operation 910. When a negative edge has occurred in the input signal, the method 900 proceeds to operation 920. At operation 920, the judgment logic 130 determines whether a plurality of negative edges in the input signal exceeding a threshold number of negative edges have occurred. The threshold may be any number of negative edges chosen for defining the prescribed signal and a number of negative edges in the input signal included in the threshold is not limited herein. When the number of negative edges exceeding the threshold have occurred in the input signal, the method 900 proceeds to operation 925. When the number of negative edges that have occurred in the input signal has not exceeded the threshold, the method 900 returns to operation 910.

At operation 925, the judgment logic 130 determines that the prescribed pattern has been detected and proceeds to operation 930. At operation 930, the judgment logic 130 may determine whether the timeout condition (e.g., as discussed with respect to operation 910) has been met. When the timeout condition has not been met, the method 900 remains at operation 930. When the timeout condition has been met, the method 900 proceeds to operation 940. At operation 940, the judgment logic 130 determines that mode judgment has ended.

Figure 10:
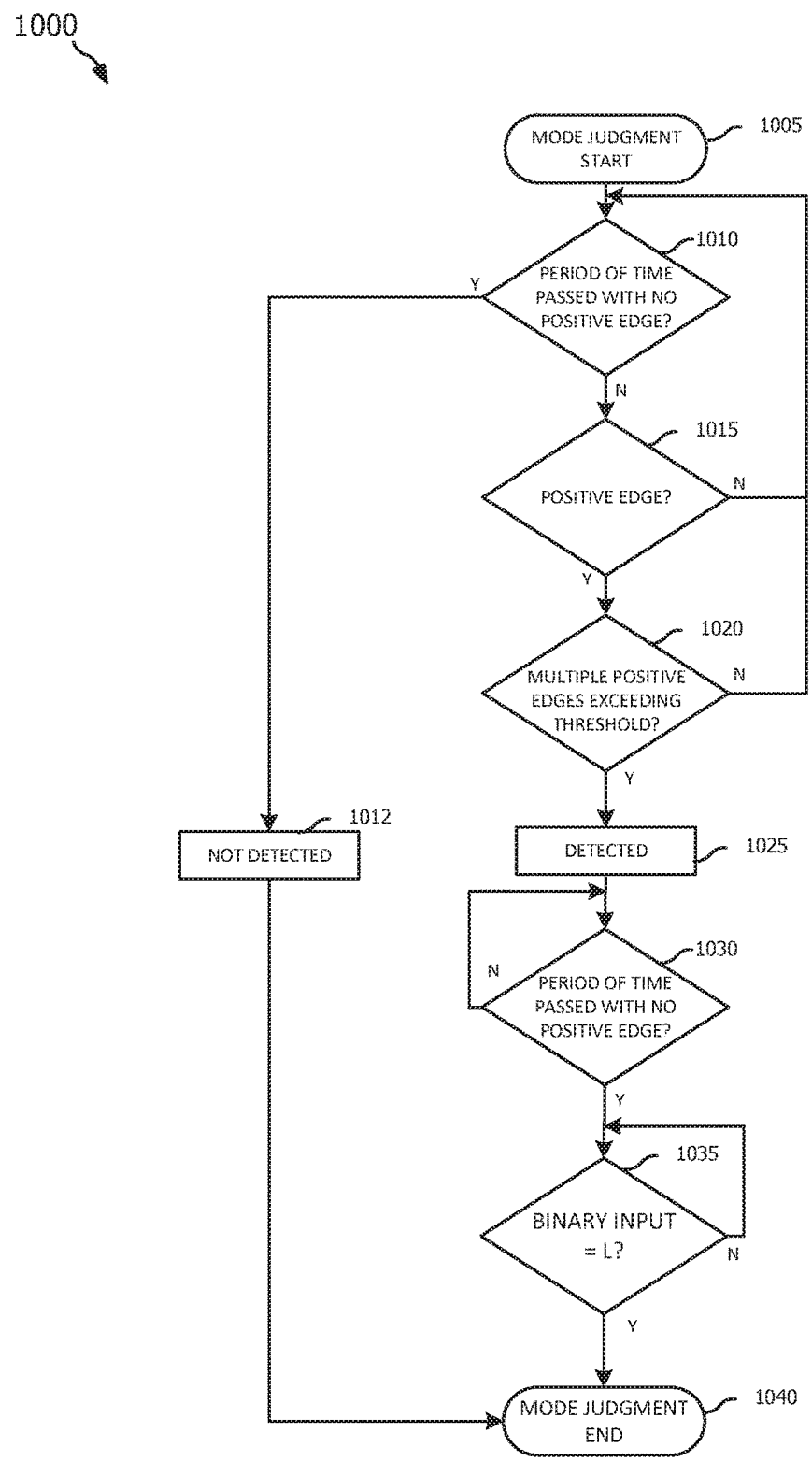
FIG. 10 is a flowchart of another method for motor driver operation mode judgment in accordance with various embodiments.

Turning now to FIG. 10, a flowchart of another method 1000 for motor driver operation mode judgment in accordance with various embodiments is shown. The method 1000 may be implemented, for example, by the judgment logic 130 to determine an operation mode (e.g., normal operation mode or setting operation mode) for the motor driver 105 according to an input signal received by the motor driver 105. The operation mode may be determined, for example, based on a plurality of binary transitions in an input signal of the judgment logic 130 occurring, or not occurring, during a predefined period of time.

At operation 1005, the judgment logic 130 begins mode judgment. For example, in response to receipt of a judgment start signal (e.g., such as a judgment start signal received from logic circuit 155, as discussed above). At operation 1010, the judgment logic 130 determines whether a predefined amount of time has elapsed without a positive edge in the signal (e.g., a predefined amount of time has elapsed without the signal changing from the low binary or logic level to a high binary or logic level). When the predefined amount of time has not elapsed without a positive edge in the signal (e.g., a positive edge in the signal occurring during the predefined amount of time), the method 1000 proceeds to operation 1015. When the predefined amount of time has elapsed without a positive edge in the signal, the method 1000 proceeds to operation 1012. At operation 1012, the judgment logic 130 determines that the prescribed pattern has not been detected and proceeds to operation 1040. Returning now to operation 1015, the judgment logic 130 determines whether a positive edge has occurred in the signal. When a positive edge has not occurred in the signal, the method 1000 returns to operation 1010. When a positive edge has occurred in the signal, the method 1000 proceeds to operation 1020.

At operation 1020, the judgment logic 130 determines whether a plurality of positive edges in the input signal exceeding a threshold number of positive edges have occurred. The threshold may be any number of positive edges chosen for defining the prescribed signal and a number of positive edges in the input signal included in the threshold is not limited herein. When the number of positive edges exceeding the threshold have occurred in the input signal, the method 1000 proceeds to operation 1025. When the number of positive edges that have occurred in the input signal has not exceeded the threshold, the method 1000 returns to operation 1010. At operation 1025, the judgment logic 130 determines that the prescribed pattern has been detected and proceeds to operation 1030.

At operation 1030, the judgment logic 130 determines whether a predefined amount of time has elapsed without a positive edge in the signal (e.g., a predefined amount of time has elapsed without the signal changing from the low binary or logic level to a high binary or logic level). When the predefined amount of time has not elapsed without a positive edge in the signal (e.g., a positive edge in the signal occurring during the predefined amount of time), the method 1000 remains at operation 1030. When the predefined amount of time has elapsed without a positive edge in the signal, the method 1000 proceeds to operation 1035.

At operation 1035, the judgment logic 130 may determine whether an input signal at a low binary or logic level is being received by the judgment logic 130. When an input signal at a low binary or logic level is being received by the judgment logic 130, the method 1000 proceeds to operation 1040. When a signal at a low binary or logic level is not being received by the judgment logic 130, the method 1000 remains at operation 1035. At operation 1040, the judgment logic 130 determines that mode judgment has ended.

Numerous other variations and modifications will become apparent to those skilled in the art once the above disclosure and the attached appendix are fully appreciated. It is intended that the following claims be interpreted to embrace all such variations, modifications and equivalents. Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "approximately," "substantially," and "about" mean +/−10 percent of the stated value or of a reference value. In addition, the term "or" should be interpreted in an inclusive sense.

What is claimed is:

1. A motor driver, comprising:
   a multipurpose pin configured to couple the motor driver to a controller, the multipurpose pin configured to receive an input signal; and
   judgment logic configured to process the input signal and coupled with the multipurpose pin,
   wherein during an initial period of time, the judgment logic is configured to:
   detect whether a prescribed pattern is present in the input signal; and
   if the prescribed pattern indicates a setting operation mode, signaling the motor driver to operate in a setting operation mode;

wherein the motor driver is configured to transmit an output of a frequency generator (FG) logic circuit via the multipurpose pin while in a normal operation mode.

2. The motor driver of claim 1, wherein the initial period of time is a period of time starting after the motor driver transitions to a powered-on state.

3. The motor driver of claim 1, further comprising if the prescribed pattern indicates a normal operation mode, signaling the motor driver to operate in a normal operation mode.

4. The motor driver of claim 1, wherein if the prescribed pattern is absent in the input signal, the judgment logic signals the motor driver to operate in a normal operation mode.

5. The motor driver of claim 1, wherein the judgment logic comprises:
an edge detector;
a timer circuit;
a period counter coupled to the edge detector;
an edge frequency counter coupled to the edge detector;
a pattern detector coupled to the edge detector, the timer circuit, the period counter, and the edge frequency counter; and
a signal generator coupled to the pattern detector.

6. The motor driver of claim 1, further comprising:
an interface coupled to the judgment logic and the multipurpose pin; and
a logic circuit coupled to a memory, the judgment logic, and the interface,
wherein the FG logic circuit is configured to be coupled to the logic circuit, the judgment logic, and the multipurpose pin.

7. The motor driver of claim 6, wherein the interface comprises a trial driving signal generator, and wherein the trial driving signal generator is configured to generate a signal at least partially for use by the motor driver in driving a motor when the motor driver is operating in the setting operation mode.

8. The motor driver of claim 6, wherein the logic circuit comprises an enable signal controller and a driving signal generator, wherein the enable signal controller is coupled to the trial driving signal generator and the driving signal generator, and wherein the enable signal controller is configured to generate a signal for use in driving the motor at least partially according to input received from the trial driving signal generator and the driving signal generator.

9. The motor driver of claim 6, wherein the judgment logic is configured to transmit a setting mode enable signal to the interface when operating in the setting operation mode to cause the interface to be configured to transmit received data to a memory for storage.

10. A motor control system comprising:
a motor driver configured to couple to a motor and drive the motor; and
a controller coupled to the motor driver through a multipurpose pin, the controller configured to control the motor driver,
wherein the motor driver is configured to receive input from the controller via the multipurpose pin during a setting operation mode of the motor driver, and
wherein the motor driver is configured to output a frequency generator (FG) signal to the controller via the multipurpose pin during a normal operation mode of the motor driver.

11. The system of claim 10, further comprising judgment logic configured to process the input signal and coupled with the multipurpose pin, wherein during an initial period of time, the judgment logic is configured to:
detect whether a prescribed pattern is present in the input signal; and
if the prescribed pattern indicates a setting operation mode, signaling the motor driver to operate in a setting operation mode.

12. The system of claim 11, wherein the initial period of time is a period of time starting after the motor driver transitions to a powered-on state.

13. The system of claim 11, further comprising if the prescribed pattern indicates a normal operation mode, signaling the motor driver to operate in a normal operation mode.

14. The system of claim 11, wherein if the prescribed pattern is absent in the input signal, the judgment logic signals the motor driver to operate in a normal operation mode.

15. The system of claim 10, wherein the multipurpose pin is a FG pin.

16. The system of claim 15, wherein the motor driver is configured to output a FG signal indicating a status of the motor via the FG pin or receives serial communication data from the controller via the FG pin.

17. A method of setting an operating mode of a motor driver, the method comprising:
receiving at a multipurpose pin coupled with a motor driver, an input signal;
processing the input signal using judgment logic to detect whether a prescribed pattern is present in the input signal;
if the prescribed pattern is present, if the prescribed pattern indicates a setting operation mode, signaling the motor driver to operate in a setting operation mode;
if the prescribed pattern is absent, signaling the motor driver to operate in a normal operation mode,
wherein the motor driver is configured to transmit an output of a frequency generator (FG) logic circuit via the multipurpose pin while in the normal operation mode.

18. The motor driver of claim 17, further comprising if the prescribed pattern indicates a normal operation mode, signaling the motor driver to operate in a normal operation mode.

19. The method of claim 17, further comprising receiving the prescribed pattern a plurality of times in the input signal received by the multipurpose pin.

20. The method of claim 17, wherein the judgment logic detects the presence of the prescribed pattern in the input signal using one of edge detection, a period count, or edge frequency count.

* * * * *